March 26, 1946.                W. P. FARRELL                2,397,342
                          LUBRICANT-CARRYING MEANS
                          Filed March 18, 1944
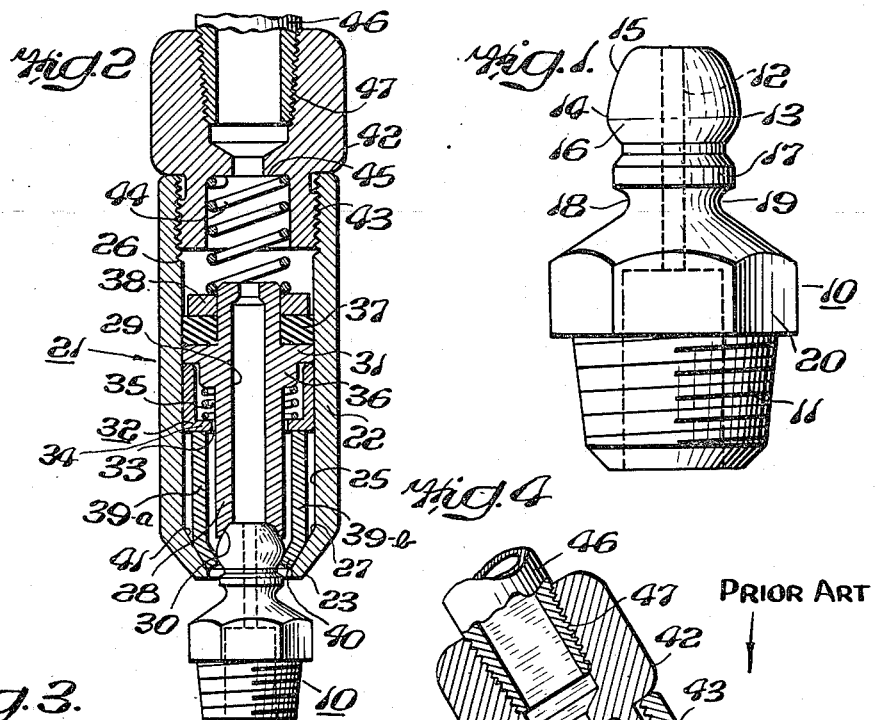
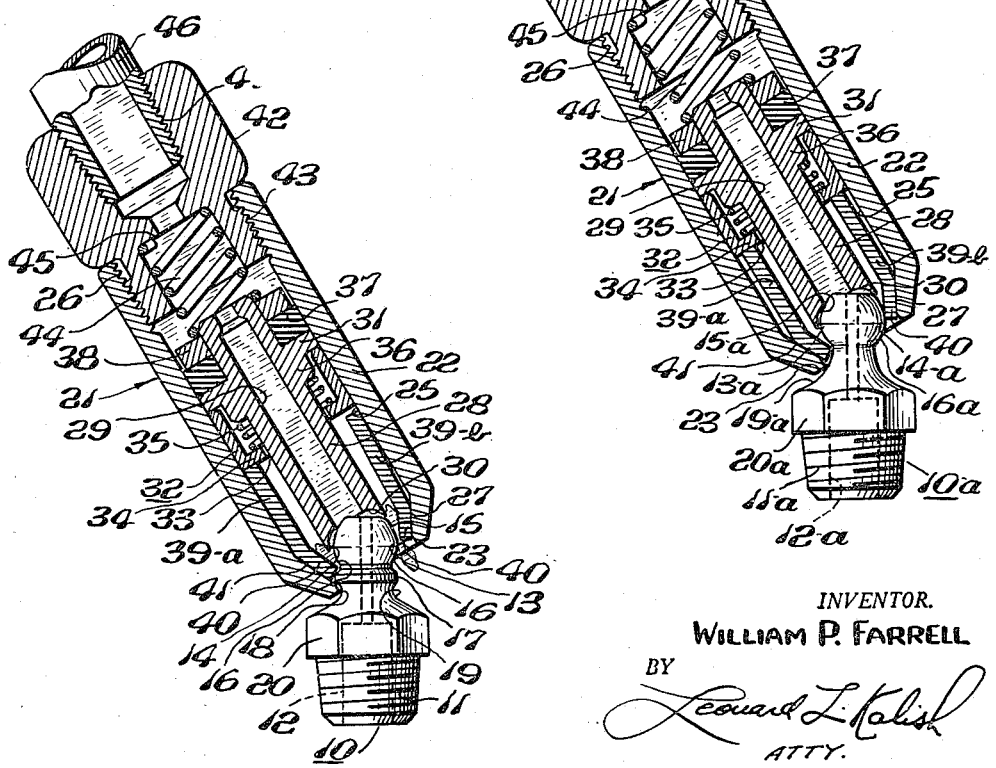
INVENTOR.
WILLIAM P. FARRELL
BY
Leonard L. Kalish
ATTY.

Patented Mar. 26, 1946

2,397,342

UNITED STATES PATENT OFFICE 2,397,342

LUBRICANT-CARRYING MEANS

William P. Farrell, Rosedale, Pa., assignor to Universal Lubricating Systems, Inc., Oakmont, Pa., a corporation of Delaware Application March 18, 1944, Serial No. 527,132

3 Claims. (Cl. 285—169)

The present invention relates to lubricant-carrying means and it relates more particularly to hydraulic couplers and fittings for making quick attachable and detachable connection in lubricating systems.

An object of the present invention is to provide certain new and useful means for more efficiently making quick attachable and detachable connection in a system carrying fluid under pressure. Another object of the present invention is to provide a new and improved hydraulic coupler and fitting whereby the coupler can be more easily uncoupled from the fitting after use and whereby such uncoupling can be accomplished with a minimum of strain upon the fitting. Still another object of the present invention is to provide, for use with a hydraulic coupler, a new and improved fitting which will permit the coupler to be uncoupled from the fitting more easily and with a minimum strain upon the fitting.

Other objects and advantages of the present invention are apparent in the following detailed description, appended claims and accompanying drawings.

In connection with systems for supplying grease or other viscous lubricants under pressure to bearings or other similar parts requiring lubrication, it has been common practice in the past to provide the bearing or other part to be lubricated with an apertured "fitting" and to provide the lubricant line with a coupler capable of making quick attachable and detachable fluid-tight sealing connection with the fitting.

One common type of connection, conventionally known as the hydraulic coupler and fitting, employs a fitting having a rounded or knob-like head and a coupler having a plurality of gripping jaws adapted manually to be forced onto the head of the fitting and to be forced into gripping relationship therewith by the fluid pressure of the lubricant being supplied.

In uncoupling a hydraulic coupler from conventional type fittings heretofore employed, it has been the practice to tilt the coupler and thus by leverage to cause the head of the fitting to force back one of the gripping jaws sufficiently to permit the coupler to be pulled away over the head of the fitting and thus to break the fluid seal between the coupler and the fitting. This, however, has had serious disadvantages since it causes undue binding and friction of the jaws and scoring and distortion of the fitting. Indeed, the strain on the fitting is so great that the fitting sometimes breaks at the small diameter of its neck.

Accordingly, the present invention contemplates a new and improved fitting which permits the hydraulic coupler to be uncoupled therefrom more easily and without any appreciable strain upon the head of the fitting and without any undesirable scoring or distortion of the head.

In general, the new and improved fitting forming part of the present invention is so designed that, upon tilting or "cocking" of the hydraulic coupler, force is exerted directly upon one of the gripping jaws to cause it to retract and to break the fluid seal and thus to permit ready removal of the coupler without the exertion of any appreciable stress or strain upon the head of the fitting.

For the purpose of illustrating the invention, there is shown in the accompanying drawing one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1 represents a side elevational view, on an enlarged scale, of a fitting forming part of the present invention.

Figure 2 represents a view, partly in cross section and partly in elevation, showing a hydraulic coupler coupled upon the fitting of Figure 1, as it appears during operation with lubricant passing from the coupler into the fitting.

Figure 3 represents a view generally similar to that of Figure 2 but showing the appearance of the parts after lubrication has been completed and after the coupler has been tilted to break the fluid seal and thereby to permit removal of the coupler.

Figure 4 represents a view similar to that of Figure 3 but showing the appearance of the parts when a conventional type fitting is employed in place of the improved fitting of the present invention.

In one embodiment of the present invention shown generally in Figures 1 to 3, I may provide a fitting indicated generally by the reference character 10. The fitting 10 is externally screw-threaded as at 11 for connection to a conduit leading to a bearing or the like (not shown) and is provided with an axially-extending opening 12.

A rounded knob-like head 13 is provided at the end of the fitting; the head 13 being thickest at its center as at 14 and having oppositely tapered top and bottom curved surfaces 15 and 16 respectively.

A beveled shoulder 17 is provided just below the head 13; the shoulder 17 having a transverse dimension generally the same as the center zone 14 of the head 13.

An annular groove 18 of substantial depth is provided in the neck 19 of the fitting 10 just below the shoulder 17; the neck 19 flaring outwardly and downwardly from the groove 18 to a hexagonal grapping surface 20 which is provided at the upper end of the screw threads 11.

A hydraulic coupler, indicated generally by the reference character 21, includes a generally tubular main body housing or shell 22 having a tapered nose or tip 23 at its forward end; the nose or tip 23 being provided with a central opening 24 therein.

The housing 22 is provided with an internal generally cylindrical inner bore 25 and may be internally screw-threaded at its rear end as at 26.

An inner annular tapered camming surface 27 is provided inside the nose or tip 23 of the housing 22.

A generally cylindrical sealing plunger 28, having an axial opening 29 therethrough and having a generally concave spherical sealing surface 30 at its outer or forward end, is provided with an annular shoulder 31 adapted to fit snugly within the cylindrical bore 25 of the housing 22 and to permit said plunger 28 to move axially within said inner bore 25.

The sealing surface 30 of the plunger 28 corresponds to the upper curved surface 15 of the fitting 10 so that, when the plunger 28 is forced against the fitting 10, a fluid-tight seal is established between the surface 15 of the head 13 and the surface 30 of the plunger 28.

A generally cup-shaped member 32 having a central opening 33 in its end wall 34 is fitted about the sealing plunger 28 forward of the shoulder 31 of said plunger 28; the plunger 28 passing through the opening 33. The cup-shaped member 32 is adapted to fit snugly within the cylindrical inner bore 25 of the housing 22 and to move axially therein.

A coil spring 35 is disposed within the cup-shaped member 32. The rear end of the spring 35 is seated against a cylindrical portion 36 of said sealing plunger; the cylindrical portion 36 extending within the cup-shaped member 32 in piston-cylinder relationship therewith.

An apertured sealing gasket 37 is fitted about the rear end of the sealing plunger 28 behind the shoulder 31 of said plunger 28; the gasket 37 being adapted to establish a fluid-tight sealing relationship between the sealing plunger 28 and the cylindrical inner bore 25 of the housing 22.

A washer 38 of metal or the like is fitted about the sealing plunger 28 to the rear of the gasket 37.

A plurality, preferably 3, of nipple-gripping jaws 39, each transversely curved to form approximately one-third of the circumference, surround the sealing plunger 32 forward of the cup-shaped member 32. The front ends of the jaws 39 extend forwardly somewhat beyond the front end of the sealing plunger 28 and terminate in inwardly-extending nipple-gripping fingers 40 having outer inclined camming surfaces 41 adapted to ride upon and to co-act with the inclined annular camming surface 27 of the housing 22.

The rearmost ends of the gripping jaws 39 are normally seated against the end wall 34 of the cup-shaped member 32.

An axially-apertured plug member 42 is adapted to be connected to the rear end of the housing 22 by means of external screw-threads 43 which engage with the internal threads 26 on said housing 22.

A coil spring 44 has its rear end seated against a shoulder 45 formed in said plug member 42 and has its forward end seated against the washer 38. Thus, the spring 44 urges the sealing plunger 28 forwardly within the housing 22 and also, acting through the cup-shaped member 32, urges the gripping jaws 39 forwardly within said housing so as normally to maintain the nipple-gripping fingers 40 of said jaws 39 in radially inward gripping position. Should a rearward or inward pressure be exerted upon the sealing plunger 28 so as to move it rearward against the force of the coil spring 44, the gripping jaws 39 and the cup-shaped member 32 will be maintained in their forwardmost position by the spring 35 which expands to take up the rearward motion of the portion 36 of said sealing plunger 28.

Thus, it is apparent that an inward force exerted upon the sealing plunger alone will not move the jaws 39 inward. However, any inward force applied to any one of the jaws 39 will move the cup-shaped member 32 and the sealing plunger 28 rearward against the force of the spring 44.

A lubricant supply line 46 is screw-threadedly connected within the rear of the apertured plug member 42 as at 47 and is adapted to supply lubricant under pressure thereto.

When the coupler 21 is to be connected to the fitting 10 for lubricating a bearing or the like, the opening 24 of the nose 23 of said coupler 21 is placed in line with the head 13 of the fitting and the coupler is pushed manually directly down upon the fitting 10. This force moves the sealing plunger 28 rearwardly within the housing 22 and also moves the jaws 39 rearwardly until the nipple-gripping fingers 40 of said jaws 39 expand sufficiently to pass over the largest diameter 14 of the head 13 of said fitting. After the fingers 40 of the jaws 39 pass the largest diameter 14 of the head 13, the nipple-gripping fingers 40 will snap forwardly to enclose the lower surface 16 of the head 13 and thus to hold the coupler upon the fitting as shown in Figure 2. In this position also, the sealing surface 30 of the plunger 28 fits snugly upon the top surface 15 of the head 13 of the nipple.

Figure 2 shows the coupler in operating position upon the fitting 10 after lubrication under pressure has been permitted to flow through the supply line 47, the apertured plug member 42, the opening 29 in the sealing plunger 28 and into the opening 12 of the fitting 10.

In this operating position, the lubricant (which may be supplied at extremely high pressures) exerts a very much greater force upon the gasket 37 than did the spring 44 alone. Thus, the sealing surface 30 of the plunger 28 is maintained in fluid-tight relationship with the upper surface 15 of the head 13 of the fitting and the nipple-gripping fingers 40 are firmly locked about the bottom surface 16 of the head 13 so that it is impossible to withdraw the coupler from the fitting by pulling on it.

After lubrication has been completed and the lubricant supply pump (not shown) has been stopped, the lubricant in the supply line 46 and in the rear of the gasket 37 still is under high pressure sufficient to prevent pulling off of the coupler from the fitting.

When it is desired to remove the coupler from the fitting, the fitting is tilted approximately 15 degrees from the vertical position shown in Figure 2 to the position shown in Figure 3. In this position, it can be seen that the shoulder 17 of the fitting 10 contacts the finger of one of the gripping jaws 39—$a$ and thus forces the gripping jaw 39—$a$ rearwardly from its forwardmost gripping position. This moves the cup-shaped member 32 and the sealing plunger 28 rearwardly sufficiently to break the seal between the sealing surface 30 of the plunger 28 and the upper surface 15 of the head 13 of the fitting and allows lubricant to seep out from the opening 29 of the sealing plunger and through the opening 24 in the nose 23 of the housing 22. This seepage relieves the lubricant pressure behind the gasket 37 so that only spring-pressure is exerted upon the sealing plunger 28 and the gripping jaws 39. Thus, upon slight further tilting of the coupler, it can easily be withdrawn from over the head 13 of the fitting 10. As can be seen in Figure 3, the only point of pressure between the coupler and the fitting during this withdrawing operation is the point of contact between the gripping jaw 39—$a$ and the shoulder 17 of the fitting 10. Due to the sharply undercut groove 18 in the neck 19 of the fitting 10, the nose 23 of the housing 22 does not contact the fitting. Similarly, there is no appreciable contact or pressure exerted upon the top surface 15 of the head 13 of the fitting 10 by the fingers of the other jaws 39—$b$.

To more clearly point out the marked advantages attained by the novel construction of the present invention, there is shown, in Figure 4 of the drawing, a conventional construction as it appears at the same stage of "cocking" as is illustrated in Figure 3.

Thus, in the conventional construction of Figure 4, a fitting 10—$a$ having screw-threads 11—$a$ and an axial opening 12—$a$ is provided with a head 13—$a$ generally similar to the head 13 of the fitting 10 and having a top surface 15—$a$, a bottom surface 16—$a$ and a maximum diameter or transverse dimension 14—$a$. The fitting 10—$a$ does not have a shoulder beneath the head 13—$a$ and, instead of being grooved or undercut, the neck 19—$a$ of the fitting 10—$a$ tapers outwardly from the base of the head 13—$a$ down to the hexagonal gripping surface 20—$a$ thereof.

When the coupler 21 (after having been coupled to the fitting 10—$a$ and having supplied lubricant thereto) is "cocked" to the position shown in Figure 4 for uncoupling, the nose or tip 23 of the housing 22 of the coupler 21 contacts the neck 19—$a$ of the coupler (the point of contact acting as the fulcrum of the lever during the cocking operation) while the tip of the gripping jaw 39—$b$ bears against the top surface 15—$a$ of the fitting 10—$a$. When the coupler 21 is cocked further, the leverage creates very great pressure at the point of contact between the nose 23 and the neck 19—$a$ and also at the point of contact between the finger of the gripping jaw 39—$b$ and the top surface 15—$a$ of the fitting 10—$a$. As the coupler is cocked still further, the finger of the gripping jaw 39—$b$ is caused to move across the surface 15—$a$ of the head 13—$a$ of the fitting 10—$a$ until the head 13—$a$ is clear of the gripping jaws.

It can be seen that, in this conventional construction, the sealing surface 30 of the plunger 28 remains in fluid-tight sealing relationship with the top surface 15—$a$ of the head 13—$a$ of the fitting 10—$a$ until the withdrawing operation is virtually completed. Thus, the extremely great hydraulic pressure exerted upon the neck 19—$a$ of the fitting 10—$a$ and also upon the top surface 15—$a$ of the head 13—$a$ is maintained until virtually the end of the uncoupling operation. As a result, considerable binding and friction result along the line of contact between the finger of the gripping jaw 39—$b$ and the surface 15—$a$, and scoring and distortion of the fitting are quite common at the surface 15—$a$ and the neck 19—$a$ after any extended period of use. Furthermore, the binding and friction results in undue wear and scoring of the fingers of the gripping jaws so as to require replacement of these jaws after relatively short periods of operation of the coupler.

It is apparent, therefore, that the novel construction of the present invention is greatly superior to conventional constructions heretofore known in that it eliminates the binding and friction between the coupler and the fitting and thus lengthens the life of the fitting and also of the gripping jaws of the coupler.

I have found that, by employing the construction of my present invention, the fittings have a considerably longer life and remain in their original undistorted and unscored condition for much greater periods of time than is the case with conventional constructions. I have also found that the life of the gripping jaws of couplers when used according to my present invention is considerably greater than that of gripping jaws used according to conventional constructions.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described my invention, what I claim as new and desire to protect by Letters Patent is:

1. For use with a quick attachable and detachable snap-on hydraulic coupler having an apertured sealing plunger and a plurality of nipple-gripping jaws surrounding said plunger, said plunger being moved rearwardly upon rearward movement of any of said jaws; an apertured fitting adapted to make fluid-tight engagement with said coupler and to receive lubricant or the like under pressure therefrom, said fitting comprising a rounded knob-like head adapted to enter said coupler and to make fluid-tight abutting contact with the end of said sealing plunger and to be gripped by said jaws about the under surface thereof, an annular shoulder formed directly below said head, and a neck extending downwardly and outwardly from said shoulder and having a relatively deep annular groove formed therein directly below said shoulder, said shoulder being adapted, when said coupler is tilted or cocked upon said head, to force one of said jaws rearwardly within said coupler and thereby to force the sealing plunger out of sealing relationship with the head of the fitting, said groove preventing contact between the exterior of the coupler and the neck of the fitting during said tilting of the coupler.

2. For use with a quick attachable and detacheble snap-on hydraulic coupler having an apertured sealing plunger and a plurality of nipple-gripping jaws surrounding said plunger, said plunger being moved rearwardly upon rearward movement of any of said jaws; an apertured fitting adapted to make fluid-tight engagement with said coupler and to receive lubricant or the like under pressure therefrom, said fitting comprising a rounded knob-like head adapted to enter said coupler and to make fluid-tight abutting contact with the end of said sealing plunger and to be gripped by said jaws about the under surface thereof, a neck extending downwardly from said head, means forming an integral part of said fitting for forcing one of said jaws rearwardly when said coupler is tilted or cocked upon said head thereby to force the sealing plunger out of sealing relationship with the head of the fitting, and means for preventing contact between the exterior of the coupler and the neck of the fitting during said tilting of the coupler.

3. An apertured fitting for receiving lubricant or the like under pressure comprising a relatively small rounded knob-like head formed on the end of said fitting, an annular shoulder formed directly below said head, and a flared neck extending downwardly from said shoulder, said neck having a relatively deep annular groove formed therein directly below said shoulder.

WILLIAM P. FARRELL.